United States Patent [19]
Gilles et al.

[11] Patent Number: 5,134,877
[45] Date of Patent: Aug. 4, 1992

[54] PORTABLE, COUNTERFLOW HELIUM LEAK DETECTOR FOR TESTING AN ENCLOSURE HAVING ITS OWN PUMPING EQUIPMENT

[75] Inventors: Baret Gilles, Annecy; Gevaud Roland, Pringy, both of France

[73] Assignee: Alcatel Cit, Paris, France

[21] Appl. No.: 652,738

[22] Filed: Feb. 8, 1991

[30] Foreign Application Priority Data

Feb. 9, 1990 [FR] France .................. 90 01534

[51] Int. Cl.[5] .......................................... G01M 3/20
[52] U.S. Cl. ..................................................... 73/40.7
[58] Field of Search ........................................ 73/40.7

[56] References Cited

U.S. PATENT DOCUMENTS

| | | | |
|---|---|---|---|
| 3,327,521 | 6/1967 | Briggs | 73/40.7 |
| 4,399,690 | 8/1983 | Fruzzetti | 73/40.7 |
| 4,459,844 | 7/1984 | Burkhart | 73/40.7 |
| 4,583,394 | 4/1986 | Murakami et al. | 73/40.7 |

FOREIGN PATENT DOCUMENTS

| | | |
|---|---|---|
| 0283543 | 9/1988 | European Pat. Off. . |
| 3308555 | 7/1984 | Fed. Rep. of Germany . |
| 2133552 | 7/1984 | United Kingdom . |
| 2142150 | 1/1985 | United Kingdom . |
| 2190204 | 11/1987 | United Kingdom . |

OTHER PUBLICATIONS

Type 24-120B Leak Detector, in Consolidated Electrodynamics Brochure, pp. 1-16, Mar. 1966.
Technisches Messen, vol. 54, No. 3, 1987, pp. 89-94, Munich, Germany; C. J. Kundig: "Neue Wege beim Bau und der Anwendung von Helium-Lecksuchern".
Technica, Sep. 1982, p. 867, Zurich, Switzerland: "Tragbarer Massenspektrometer-Lecksucher".

Primary Examiner—Hezron E. Williams
Assistant Examiner—Joseph W. Roskos
Attorney, Agent, or Firm—Sughrue, Mion, Zinn, Macpeak & Seas

[57] ABSTRACT

A portable counterflow helium leak detector has only one pump. The pump is a secondary vacuum pump including an inlet and an outlet. A gas analyzer is connected to the inlet of the pump. The outlet is connected via an inlet valve to a correction orifice for connection to an installation to be tested, the installation being evacuated or being capable of being connected to a primary pump. The detector further includes electronic power supply and control circuit, a power supply, and a display. The detector further includes a first pressure gauge situated between the inlet valve and the connection orifice and an ON/OFF control switch for controlling detector operation. The electronic control circuits cause the inlet valve to open and the secondary vacuum pump to start whenever the detector is powered. The control switch is in the ON position and the pressure measured by the first gauge is below a determined value. The gas analyzer is automatically switched on when the secondary vacuum pump reaches its nominal speed. A second pressure gauge is situated at the vacuum pump. The detector is powered, putting the control switch into the OFF position to cause the inlet valve to be closed if it was open, while continuing to run the pump providing the pressure measured by the second pressure gauge is below a reference value. The gas analyzer is likewise maintained in operating condition providing the pump is at its nominal speed. The pump is a mechanical rotary pump.

2 Claims, 4 Drawing Sheets

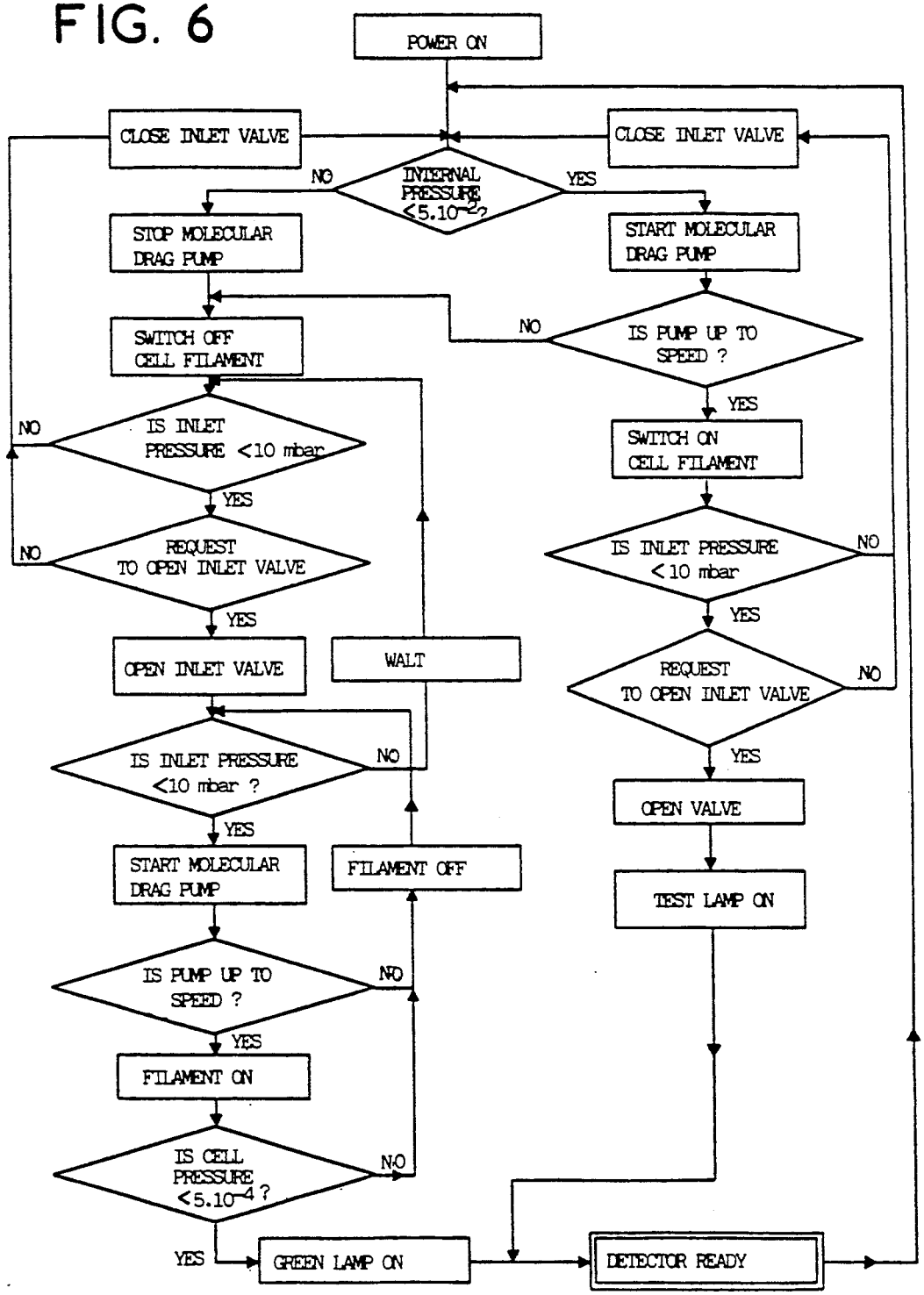

PORTABLE, COUNTERFLOW HELIUM LEAK DETECTOR FOR TESTING AN ENCLOSURE HAVING ITS OWN PUMPING EQUIPMENT

The present invention relates to a portable counterflow helium leak detector having only one pump, said pump being a secondary vacuum pump including an inlet and an outlet, a gas analyzer being connected to the inlet of said pump, said outlet being connected via an inlet valve to a connection orifice for connection to an installation to be tested, said installation being evacuated or being capable of being connected to primary pumping means, the detector further including electronic power supply and control circuits, power supply means, and display means.

BACKGROUND OF THE INVENTION

One such detector in which the secondary vacuum pump is a molecular diffusion pump is described in the "Porta-test" operating instructions dated Mar. 14, 1979 and accompanying the Porta-test helium leak detector made by Varian under the reference 0925K0777-301. When such a detector is operating in counterflow mode, the diffusion pump must operate under reduced temperature conditions to enable a counterflow of helium to pass, thus giving rise to poor stability in the helium signal. In that document, the detector is constituted by two boxes, one of which constitutes its main electronic module.

An object of the present invention is to provide a detector of the above type having a helium signal which is more stable, which is extremely simple and reliable in operation, preventing any possibility of misoperation and thus suitable for being used by non-qualified personnel, and also making it possible to save time between two successive leak tests.

SUMMARY OF THE INVENTION

The invention thus provides a leak detector as defined above, and further comprising a first pressure gauge situated between said inlet valve and said connection orifice, an ON/OFF control switch for controlling detector operation, said electronic control circuits causing said inlet valve to open and said secondary vacuum pump to start whenever, the detector being powered, said control switch is in the ON position and the pressure measured by said first gauge is below a determined value, the gas analyzer being automatically switched on when said secondary vacuum pump reaches its nominal speed, and further including a second pressure gauge situated at said vacuum pump, means being provided such that, the detector being powered, putting said control switch into the OFF position causes said inlet valve to be closed it is was open, while continuing to run said pump providing the pressure measured by said second pressure gauge is below a reference value, the gas analyzer likewise being maintained in operating condition providing the pump is at its nominal speed, said pump being a mechanical rotary pump.

The leak detector may be contained in a single suitcase provided with means for being carried by hand.

BRIEF DESCRIPTION OF THE DRAWINGS

An embodiment of the invention is described by way of example with reference to the accompanying drawings, in which:

FIG. 6 is a flow chart of the various operations.

DETAILED DESCRIPTION

Figure 1:
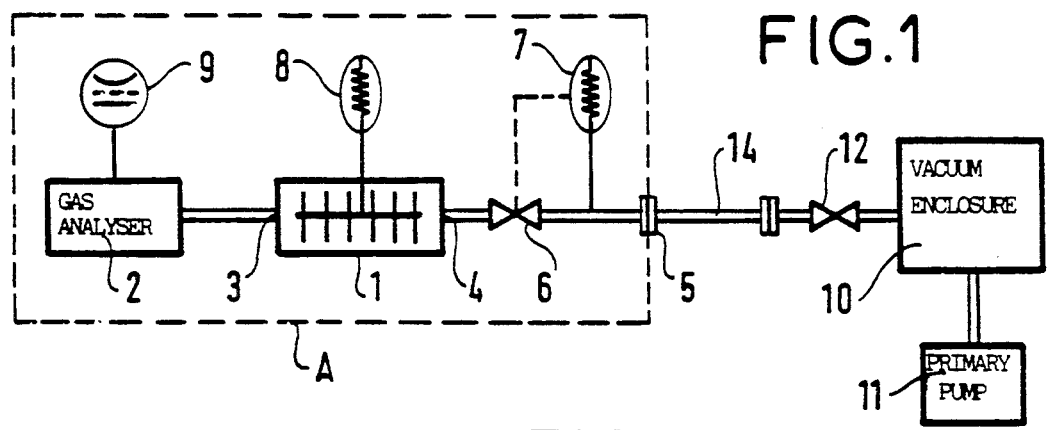
FIG. 1 is a block diagram of the vacuum circuit of the leak detector of the invention.

FIG. 1 is a block diagram of the vacuum circuit of a detector of the invention.

It includes a single pump 1 which is a molecular drag (or "turbomolecular") secondary pump and a gas analyzer 2 connected to the inlet 3 of the pump. The outlet 4 o the pump is connected via an inlet valve 6 to a connection orifice provided with a flange 5.

The inlet valve 6 is an electromagnetic valve controlled by a first pressure gauge 7 disposed between the inlet valve and the flange 5. It may be constituted, for example, by a Pirani type thermal gauge.

The detector also includes a second pressure gauge 8 of the same type as the first gauge 7 and situated at the vacuum pump 1, and a third gauge 9 of the triode gauge type situated at the gas analyzer 2.

The detector is intended to be connected to an enclosure to be tested 10 which already contains a vacuum or which is suitable for connection to primary pumping means 11. The enclosure 10 has a connection valve 12. The detector operates in so-called "counterflow" mode.

Figure 2:
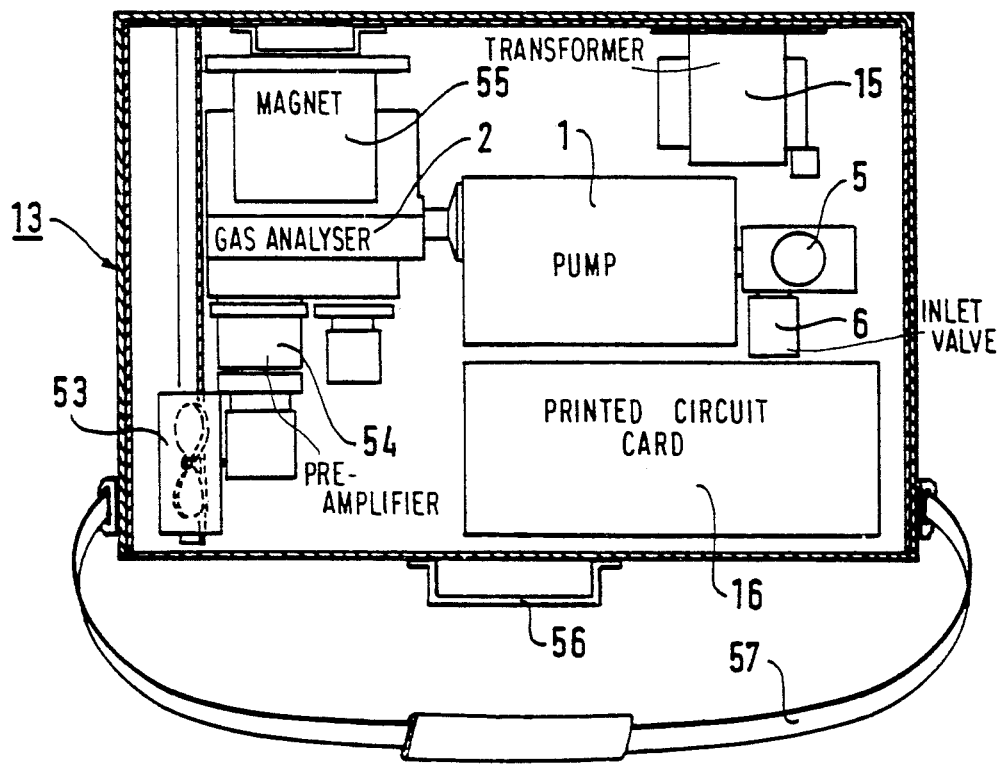
FIGS. 2 and 3 are two diagrammatic views showing how the mechanical and electrical components of the detector of the invention are installed in a case.
Figure 3:
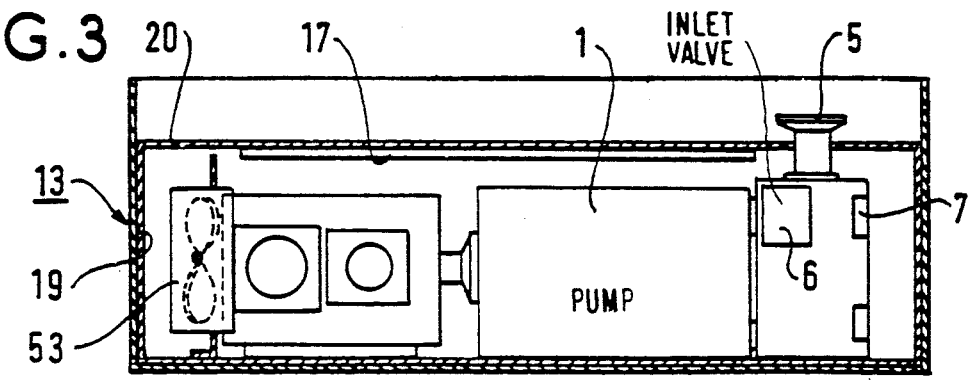

All of the components of the detector lying inside dashed-line box A are physically housed in a suitcase 13 shown in FIGS. 2 and 3. Those members lying outside said box are not housed in the case. Thus not only is the enclosure to be tested 10 outside the case, but so also the valves 12 and the pumping equipment 11. There may be room to store the removable connection duct 14 inside the case.

The inside of the case also contains all of the accessories required for detector operation, and in particular a power supply transformer 15, a printed circuit card 16 for the electronic circuits powering the pump 1, a printed circuit card 17 for the electronic circuits for control, automation, and signalling purposes, and a display and control panel 18 (see FIG. 4) including various display dials.

The assembly is fixed to an aluminum cradle 19 having a top plate 20 which includes the control panel 18.

In addition to monitoring and display devices, the control panel 18 includes an ON/OFF control switch 21 for the detector. The transformer 15 includes a power supply cord (not shown) for connection to mains, thereby powering the detector.

Figure 5:
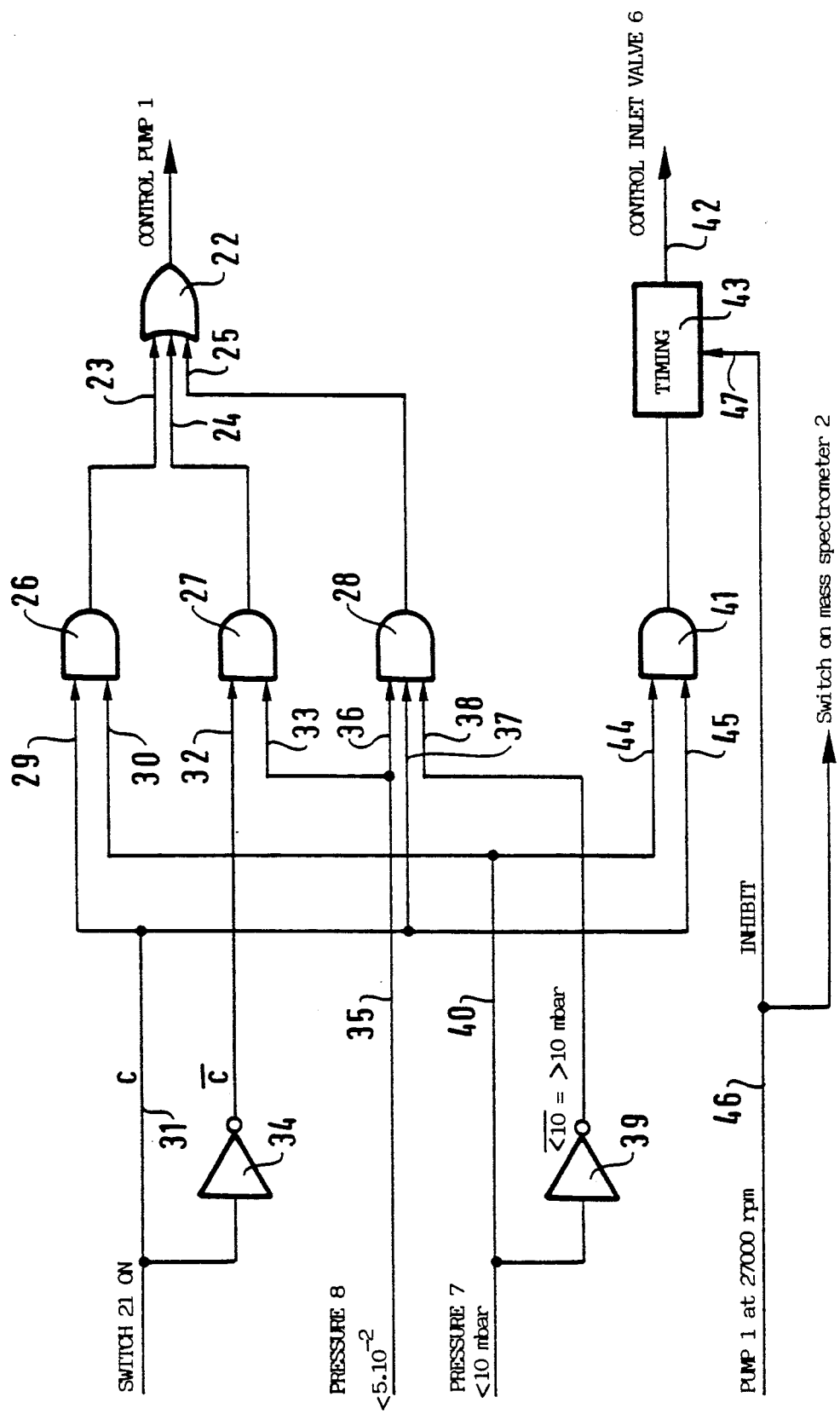
FIG. 5 is a diagram of the controlling logic circuit.

The electronic circuits on the printed circuit card 17 include, inter alia, a logic control circuit such as that shown in FIG. 5.

This circuit includes an OR gate 22 whose output controls the pump 1 and which has three inputs 23, 24, and 25 connected to respective outputs of three AND gates 26, 27, and 28.

AND gate 26 has two inputs 29 and 30. Input 29 receives a signal on a line 31 when the switch 21 is in the ON position, and input 30 receives a signal via line 40 when the pressure as measured by the first gauge 7 is below a determined value, equal to 10 mbar in the present example.

AND gate 27 likewise has two inputs 32 and 33. Input 32 is connected to the line 31 via an inverter 34 and thus receives a signal when the switch 21 is in the OFF position. Input 33 is connected to a line 35 which receives a signal when the pressure indicated by the second gauge 8 is below a reference value, equal to $5.10^{-2}$ mbar in the present example.

Finally, AND gate 28 has three inputs 36, 37, and 38. Input 36 is connected to the line 35, input 37 is connected to the line 31, and input 38 is connected to the line 40 via an inverter 39.

The logic circuit also includes a AND gate 41 whose output 42 controls opening of the inlet valve 6 via a timing circuit 43. This AND gate 41 has two inputs 44 and 45. Input 44 is connected to the line 40 and input 45 is connected to the line 31.

Thus, when the apparatus is powered, the pump 1 starts automatically and the inlet valve 6 opens providing the ON/OFF switch 21 is ON and providing the pressure measured by the first gauge 7 is below the determined value of 10 mbar.

The gas analyzer 2 (a mass spectrometer) is switched on automatically as soon as the molecular drag pump 1 reaches its nominal speed, e.g. 27,000 revolutions per minute (rpm) in the present example, as indicated on line 46 of the logic circuit shown in FIG. 5.

The timing circuit 43 has an inhibit input 47 which is connected to the line 46.

As can be seen from FIG. 5, the detector may be kept in is operating condition after a test has been performed (providing it continues to be powered). If the ON/OFF switch 21 is switched to OFF after performing such a test, the inlet valve 6 closes since the input 45 to AND gate 41 is switched off, but the pump 1 continues to be powered since OR gate 22 continues to be activated via its input 24, and in addition the mass spectrometer 2 continues to operate since the pump 1 is still rotating at its nominal speed.

If a new test is to be performed on the same enclosure, it suffices to put the switch 21 back into the ON position, and providing the pressure in duct 14 has remained below 10 mbar the valve 6 will open, otherwise the valve 6 will open once this pressure has been achieved by means of the pump 11.

If a test is to be performed on a different enclosure, the duct 14 is connected to the different enclosure, the pumping system of the enclosure is switched on, and the switch 21 is put in the ON position. As soon as the pressure in the duct drops below 10 mbar the inlet valve 6 opens and the detector can test the enclosure for leaks.

FIG. 6 is a complete flow chart of the various operating stages of the apparatus.

Figure 4:
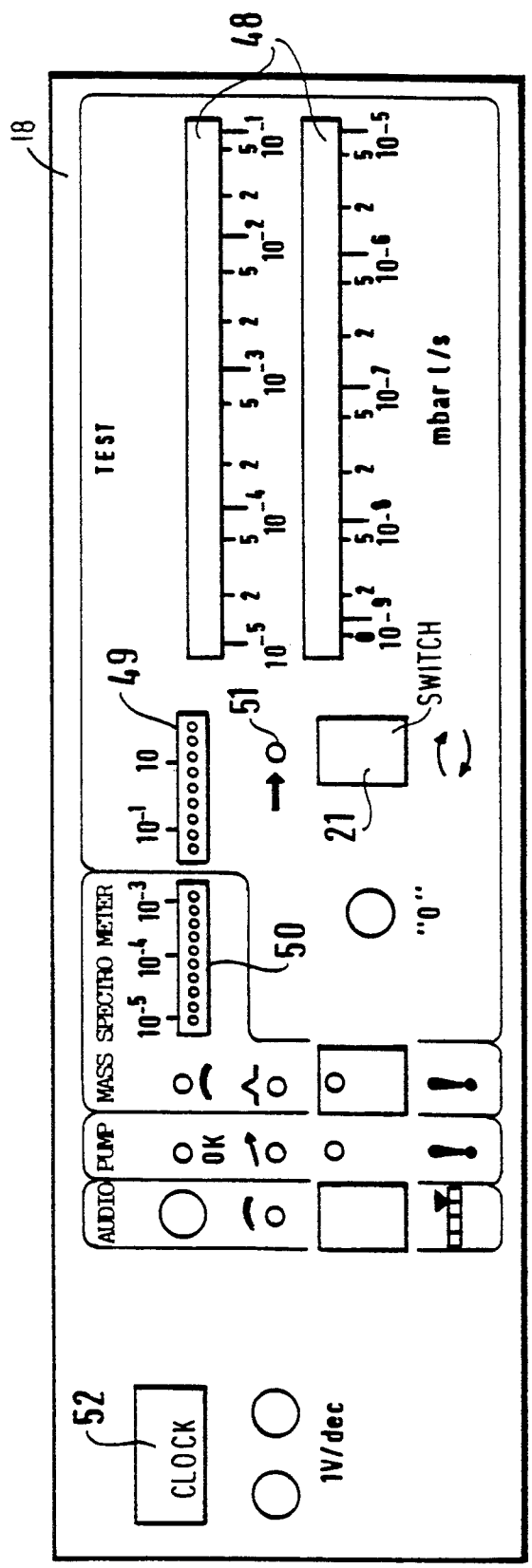
FIG. 4 shows the control panel of the detector.

The control panel of FIG. 4 has a two-part display 48 for displaying the leak being measured, a display 49 for displaying the inlet pressure as measured by the gauge 7, and a display 50 for displaying the pressure of the mass spectrometer 2. 51 is an indicator lamp representative of the state of the inlet valve 6. 52 is a clock showing the running time of the apparatus. Various other displays and adjustment controls are not essential for the invention.

The suitcase 13 includes a fan 53 for cooling the electronic circuits and the electrically controlled valve 6. 54 designates the preamplifier of the mass spectrometer and 55 its magnet. The case has a handle 56 and a carrying strap 57.

The detector of the invention included in this way in a suitcase presents numerous advantages: because of its transportability, its low weight (about 18 kg), and its robustness, it can accompany a technician anywhere regardless of the mode of transport used. This is quite novel: the technician arrives on-site with the apparatus.

In addition, no packaging is required since the suitcase constitutes packaging. There is no longer any need to wait for the detector to be received by the client, it now travels with the technician and arrives on-site simultaneously.

There are no preliminary operations to be performed before starting work: e.g. unlocking the pump, and verifying oil levels. The detector can immediately be connected to the enclosure to be tested.

Thus, by virtue of these advantages, the detector can be used in emergency repair, if necessary, as well as performing its conventional function of leak testing.

We claim:

1. A portable counterflow helium leak detector having only one pump, said pump being a secondary vacuum pump including an inlet and an outlet, a gas analyzer being connected to the inlet of said pump, said outlet being connected via an inlet valve to a correction orifice for connection to an installation to be tested, said installation being evacuated or being capable of being connected to primary pumping means, the detector further including electronic power supply and control circuits, power supply means, and display means, the detector further comprising a first pressure gauge situated between said inlet valve and said connection orifice, an ON/OFF control switch for controlling detector operation, said electronic control circuits causing said inlet valve to open and said secondary vacuum pump to start whenever, the detector being powered, said control switch is in the ON position and the pressure measured by said first gauge is below a determined value, the gas analyzer being automatically switched on when said secondary vacuum pump reaches its nominal speed, and further including a second pressure gauge situated at said vacuum pump, means being provided such that, the detector being powered, putting said control switch into the OFF position causes said inlet valve to be closed if it was open, while continuing to run said pump providing the pressure measured by said second pressure gauge is below a reference value, the gas analyzer likewise being maintained in operating condition providing the pump is at its nominal speed, said pump being a mechanical rotary pump.

2. A leak detector according to claim 1, wherein the leak detector is contained in a single suitcase provided with means for being carried by hand.

* * * * *